(12) United States Patent
Martin Ramos et al.

(10) Patent No.: US 9,041,233 B2
(45) Date of Patent: May 26, 2015

(54) ICE DETECTION METHOD AND SYSTEM FOR WIND TURBINE GENERATORS USING SUN RADIATION SENSORS

(75) Inventors: Pablo Martin Ramos, Madrid (ES); Angel Gonzalez Palacios, Madrid (ES); Inmaculada Gomez Rufas, Madrid (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 261 days.

(21) Appl. No.: 13/419,593

(22) Filed: Mar. 14, 2012

(65) Prior Publication Data

US 2012/0248771 A1 Oct. 4, 2012

(30) Foreign Application Priority Data

Mar. 30, 2011 (ES) .................................. 201100367

(51) Int. Cl.
*F03D 9/00* (2006.01)
*H02P 9/04* (2006.01)
*F03D 11/00* (2006.01)

(52) U.S. Cl.
CPC ......... *F03D 11/0025* (2013.01); *F05B 2270/80* (2013.01); *Y02E 10/722* (2013.01); *F05B 2270/325* (2013.01)

(58) Field of Classification Search
CPC . F03D 11/0025; F03D 11/0091; G01K 13/00; F05B 2270/80; F05B 2270/804; F05B 2260/80
USPC ................................................. 290/44; 416/39
See application file for complete search history.

(56) References Cited

U.S. PATENT DOCUMENTS

| | | | | |
|---|---|---|---|---|
| 4,964,115 A | * | 10/1990 | Tajima et al. | ................. 374/109 |
| 5,983,705 A | * | 11/1999 | Kitaoka et al. | ............... 73/31.01 |
| 7,086,834 B2 | | 8/2006 | LeMieux | ........................... 416/1 |
| 8,374,821 B2 | * | 2/2013 | Rousselle et al. | ............. 702/130 |
| 8,873,062 B2 | * | 10/2014 | Adler et al. | .................... 356/445 |
| 2010/0111695 A1 | * | 5/2010 | Klausmann et al. | ............ 416/39 |
| 2010/0204844 A1 | * | 8/2010 | Rettger et al. | ................ 700/291 |
| 2012/0019622 A1 | * | 1/2012 | Rousselle et al. | ............... 348/46 |
| 2012/0207589 A1 | * | 8/2012 | Fridthjof | .................... 415/121.3 |
| 2013/0156258 A1 | * | 6/2013 | Rousselle et al. | ............. 382/100 |

FOREIGN PATENT DOCUMENTS

WO    WO 2009/030252    *   3/2009    ............... F03D 7/00

* cited by examiner

*Primary Examiner* — Pedro J Cuevas
(74) *Attorney, Agent, or Firm* — Ladas & Parry LLP

(57) ABSTRACT

The present invention defines a system and method aiming at measuring the direct solar radiation received by a wind turbine generator in order to detect ice formation. The measured value is subsequently compared to a theoretical radiation curve wherein measured values on a cloudy day will be well below theoretical curves. Ice detection is made considering the presence of clouds and temperature. Measured parameters are preferably the direct sun radiation transmittance and ambient temperature.

11 Claims, 3 Drawing Sheets

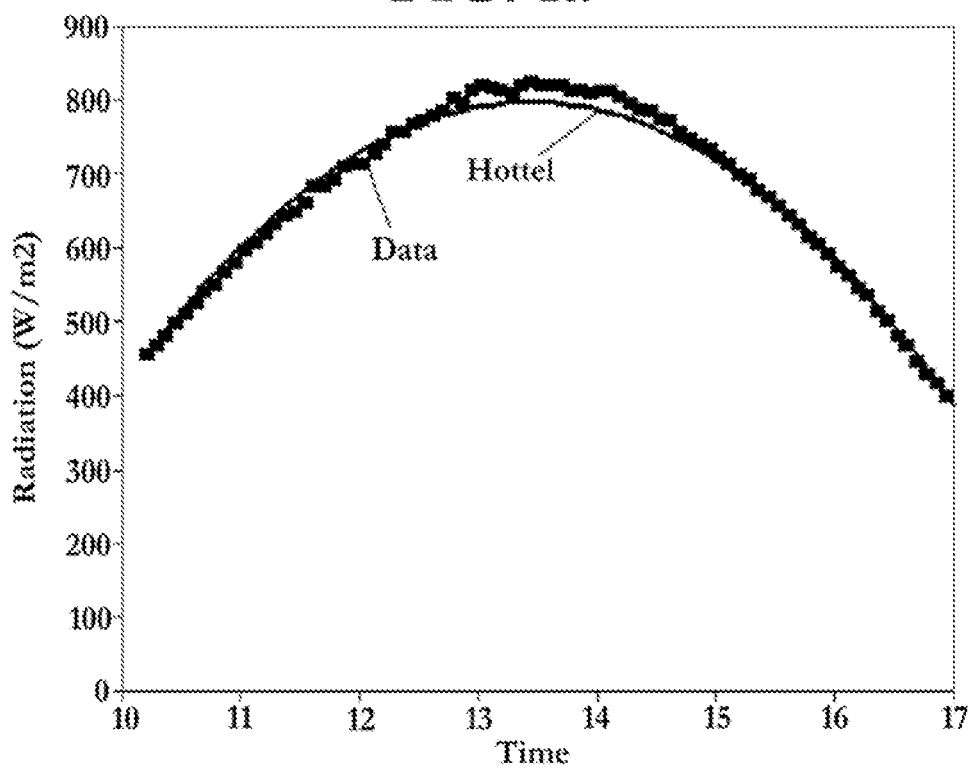

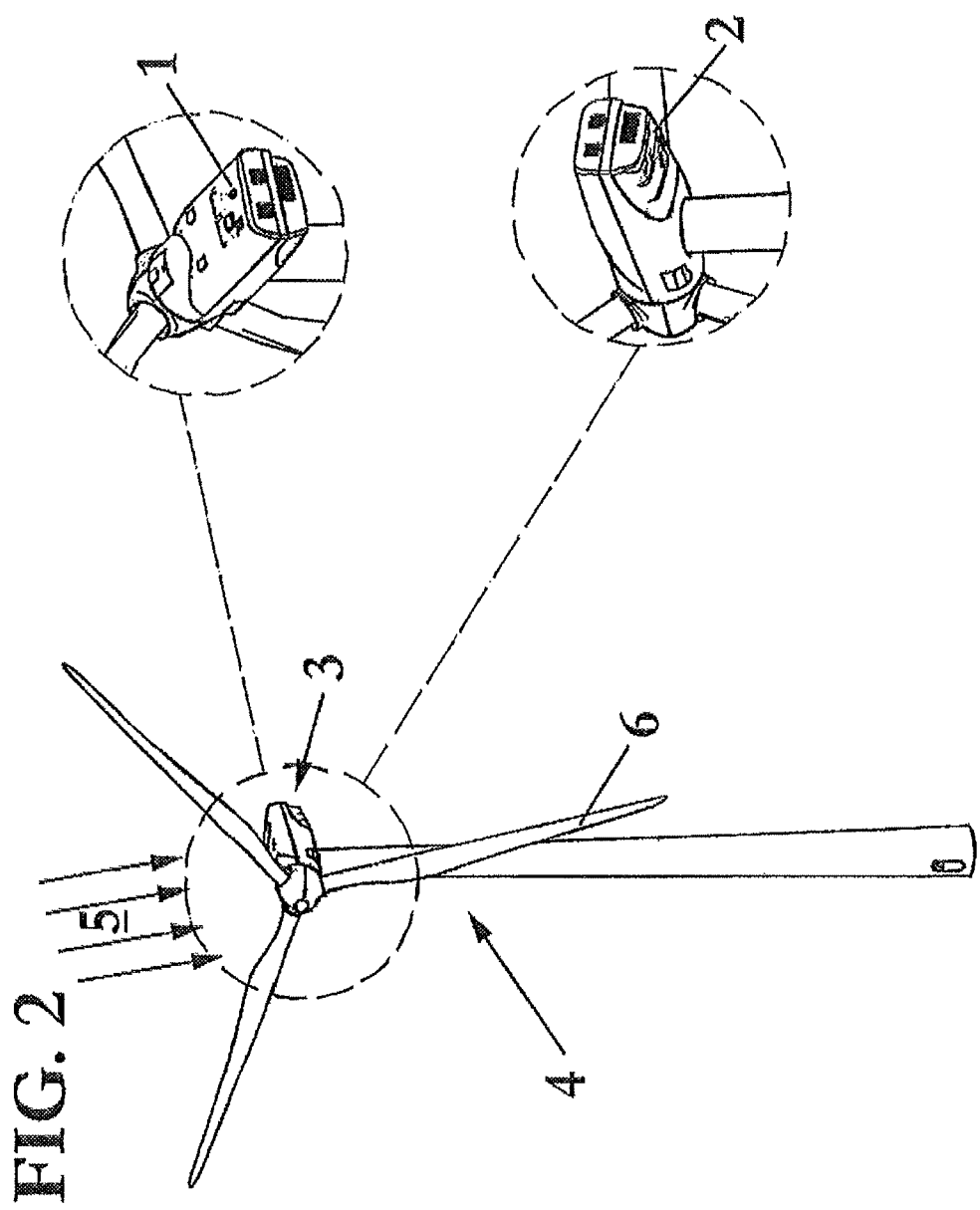

ICE DETECTION METHOD AND SYSTEM FOR WIND TURBINE GENERATORS USING SUN RADIATION SENSORS

FIELD OF THE INVENTION

The present invention refers to a system and method of detecting ice formation in wind turbine generators, especially on turbine blades, using sun direct radiation sensors.

BACKGROUND OF THE INVENTION

Due to the presence of wind farms in cold areas it is sometimes necessary to implement a system and a method that is able to detect anomalies on the power generated curves caused by the formation of ice or frost on the turbine rotor blades and other main components.

Ice accumulation in wind turbines poses a major problem in cold climate areas that both reduces the output of produced energy and shortens the expected lifetime of major wind turbine components. Wind turbines may be affected by several types of ice such as frost, sub cooled rain, wet snow, rime etc.

It is furthermore a problem not only encountered in cold climates, but it may also occur under a myriad of different conditions. Icing can occur in coastal areas, mainly of higher latitudes, as well as in mountainous terrain. The major problem at mountainous areas or near the top of hills is the formation of ice when the base of a cloud is situated at a lower height or altitude than the wind turbine hub or nacelle. Such an event is referred to as in-cloud icing. Snow rain is another common form of ice formation. Both cases normally show cloudiness conditions in common. On the other side it has been demonstrated that no ice formation will appear when skies are clear.

Known standards, such as Norm ISO 12494, define several types of ice and their meteorological conditions for them to form. Empirical variables include wind speed and direction, temperature and duration of the in-cloud condition for the wind turbine. These systems typically use hygrometers that are based on the principle that water vapour inside the clouds is very close or higher than the saturating vapour pressure. This means that the relative humidity is generally higher than 95%. However, said systems are not entirely reliable. In coastal areas and in offshore wind farms values of relative humidity may be high at all times, even without the presence of any clouds.

One of said systems is described in the patent document U.S. Pat. No. 7,086,834. A method for detecting ice on a rotor blade includes monitoring meteorological conditions and monitoring physical characteristics of the wind turbine that may cause a mass imbalance between the rotor blades.

Yet another problem of known systems is encountered on the hydrometer itself. If the calibration is effected for a value of water vapour saturating pressure when said water is in liquid form, it may result that incorrect relative humidity readings are obtained when temperature is lower than 0° C.

It is thus an object of the present invention to propose a system and method capable of detecting cloudiness conditions in a wind farm without the disadvantages of the prior art and to add a signal into a control algorithm for wind formation detection in a precise manner.

It is yet another object of the present invention to propose an alternative system and method that is simple and reliable and does not pose calibration problems.

SUMMARY OF THE INVENTION

The present invention aims to measure the solar radiation received by a wind turbine generator in order to detect ice formation. The measured value is subsequently compared to a theoretical radiation curve wherein measured values on a cloudy day will be well below theoretical curves. Ice detection is preferably made considering the presence of clouds and a low temperature.

The present invention defines and ice detector system for a wind turbine generator comprising a temperature input for a signal representing the ambient temperature at the location of said wind turbine generator, and comprising a direct sun radiation sensor located at or on said wind turbine generator, and further comprising transmittance calculation means for calculating a parameter related to the direct sun radiation transmittance value based on a measured direct sun radiation value and a predetermined reference value, and comprising ice detection means for generating an ice detection signal based on said transmittance value and said ambient temperature at the location of the wind turbine generator.

Preferably the direct sun radiation sensor comprises a sun radiation temperature sensor partially or totally exposed to the direct sun radiation, wherein the transmittance calculating means are based on the difference between measured values by said sun radiation temperature sensor and an ambient temperature.

Advantageously said predetermined reference value is based on the direct sun radiation value received on or at the wind turbine location on a day without the presence of clouds. Moreover said predetermined reference value may be based on the Hottel's model equation. Said direct sun radiation sensor may preferably be a pyranometer.

The present invention is preferably used in a control system for a wind turbine generator and comprising input means for receiving alarm and output signals from said ice detection system, and actuating means for controlling wind turbine operation based on said alarm and output signals.

Furthermore, the present invention is preferably used in a wind farm wherein said ice detection system is placed at substantially the same height as the wind turbine hubs or nacelles situated inside the wind farm. The ice detection system is advantageously place on the nacelle from a wind turbine generator situated inside the wind farm.

The present invention also includes an ice detecting method for a wind turbine comprising the steps of providing a signal representing the ambient temperature at the location of said wind turbine generator, and measuring the direct sun radiation at or on said wind turbine generator, and calculating a parameter related to the direct sun radiation transmittance value based on a measured direct sun radiation value and a predetermined reference value, and generating an ice detection signal based on said transmittance value and said ambient temperature at the location of the wind turbine generator.

Preferably in the ice detecting method of the present invention the step of measuring the direct sun radiation at or on said wind turbine generator includes the step of measuring the temperature of a sensor at least partially exposed to the direct sun radiation, and the step of calculating a parameter related to the direct sun radiation transmittance value is based on the difference between the temperature of the sensor at least partially exposed to the direct sun radiation and the ambient temperature.

FIGURES

FIG. 1a depicts a graph showing the sun incident radiation with respect to time comparing the Hottel's model and experimental data obtained for a clear skies day.

FIG. 2 shows the location of two temperature sensors on the wind turbine nacelle.

DESCRIPTION OF THE PREFERRED EMBODIMENTS

Figure 1B:
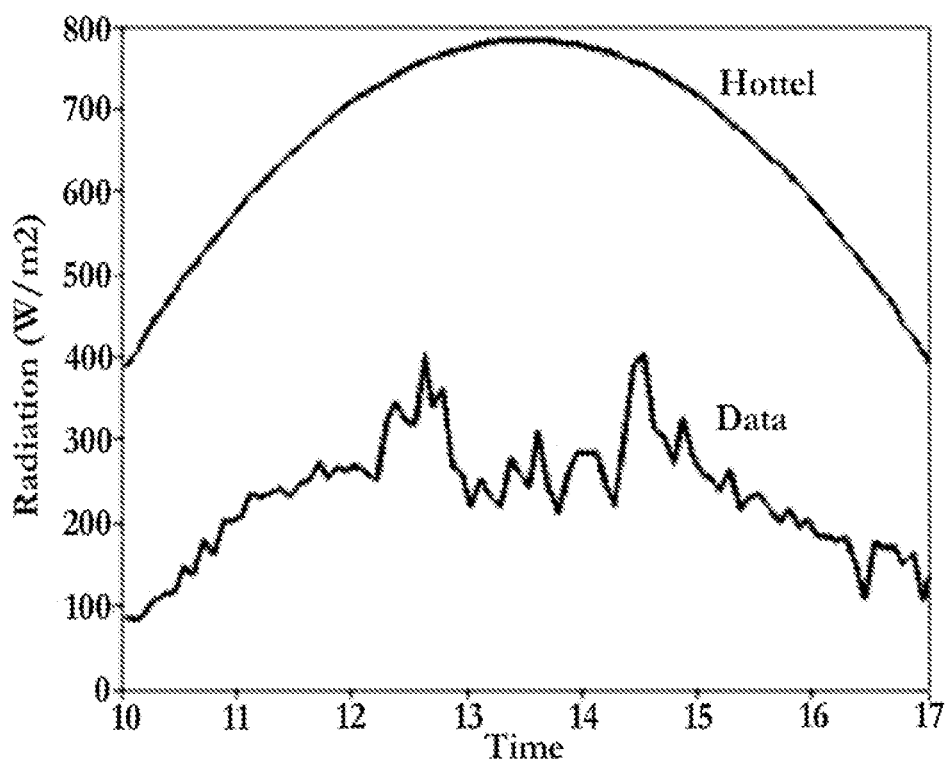
FIG. 1b depicts a graph showing the sun incident radiation with respect to time comparing the Hottel's model and experimental data obtained for a cloudy day.

One of the embodiments of the present invention is based on the use of thermal pyranometer. Said instruments are capable of measuring incoming radiation (5) at a particular location on the earth's surface. It is well known that the sun emits or radiates a vast amount of energy per unit time from its surface. Said value is approximately 1367 W/m2 at the top of the atmosphere when considering a plane normal with respect to the incoming sun radiation (5). Nevertheless, this radiation amount is greatly reduced when received at sea level. Account taken for the inclination of a sun radiation surface, the other main factor is absorption by the atmosphere. This absorption is mainly due to the presence of clouds and aerosols in the atmosphere.

The present invention aims to measure the solar radiation received by a wind turbine generator (4) and correlate said values with the likelihood of ice formation or to detect ice formation. The measured value is compared with a theoretical radiation curve wherein measured values on a cloudy day will be well below the theoretical curve. A preferred embodiment uses the Furier law of thermal pyranometer, wherein temperatures are measured and compared. One thermometer is at least partially exposed to the direct sun radiation whereas another thermometer is hidden from sun radiation and measures ambient temperature (2). The Fourier law can be expressed as follows:

$$Qc = -K(T1-T2)$$

Wherein Qc represents the heat flux that propagates through a metal bar that bridges the two thermometers mentioned above, and wherein K represents the thermal conductivity of the metal bar and wherein T1 and T2 are the temperatures measured by the two thermometers.

It can be seen that the temperature difference is directly related to the energy difference received by the two thermometers or temperature sensors; in short this energy is the received solar radiation.

A thermal pyranometer for each generator (4) may be used in order to relate the received sun radiation and a temperature difference. However, as an example of a simple embodiment it can be seen that it is possible to use theoretical and experimental radiation curves without the need of a pyranometer. Said methodology has yielded results that experimentally show errors of less than 5% in the measured values. One of such curves is defined by Hottel by the following equation:

$$\tau_b = a_0 + a_{1_1} e^{-\frac{K}{\cos(\theta z)}}$$

Wherein the first term of the equation is the sun radiation transmittance, $\tau_b$, and wherein $\theta_z$ is solar zenith angle, $a_0$, $a_1$, K are constants to be determined by every location and altitude or height. Said transmittance coefficient indicates the fraction of sun radiation that reaches the earth's surface with respect to that reaching the outer shell of the atmosphere.

It is noted that the solar zenith angle $\theta_z$ is the angle that the sun draws from a zenith or vertical direction at a location on the earth's surface.

The constants of the equation, namely $a_0$ and $a_1$ and k are experimentally calibrated to a standard atmosphere, having approximately 23 Kilometers of visibility in different types of climates. Said constants vary depending on the altitude or height with reference to see level. It is noted that the standard atmosphere is based on an average latitude without pollution contamination, which is furthermore independent from the ozone layer thickness. Said constants then take the following values:

$$a_0 = 0.4237 - 0.00821(6-A)^2$$

$$a_1 = 0.5051 + 0.0059(6.5-A)^2$$

$$k = 02711 + 0.01858(2.5-A)^2$$

wherein A is the altitude or height in kilometers from the site where observation is made.

Additionally the Hottel's model curve can be applied to a standard atmosphere defined by 5 kilometers of visibility. New constants, namely $a_0^*$, $a_1^*k^*$, must be calculated. To simplify calculations correction factors are applied $r_0 = a_0/a_0^*$, $r_1 = a_1/a_1^*$ and $r_k = k/k^*$ are equated with the following values for table 1.

TABLE 1

| | Hottel Model | | |
|---|---|---|---|
| Climate type | $r_0$ | $r_1$ | $r_k$ |
| Tropical | 0.95 | 0.98 | 1.02 |
| Summer (average latitudes) | 0.97 | 0.99 | 1.02 |
| Winter (average latitudes) | 1.03 | 1.01 | 1.00 |
| Subartic summer | 0.99 | 0.99 | 1.01 |

Thus the radiation transmittance for a standard atmosphere can already be determined for the zenithal angle or vertical or normal direction. This is mathematically expressed as:

$$G_{zbn} = G_{on}\tau_b$$

$G_{zbn}$ being the direct radiation measured by the radiation sensor; and $G_{on}$ being the extraterrestrial radiation, measured on a normal plane to the radiation, and $\tau_b$ being direct solar transmittance.

The horizontal component for a clear day equates as follow:

$$G_{zb} = G_{on}\tau_b \cos(\theta z)$$

$G_{zb}$ being the horizontal plane component of the direct solar radiation.

FIGS. 1a and 1b show a superposition of calculated and real experimental data.

FIG. 1a corresponds to a clear sky day whereas FIG. 1b depicts a graph corresponding to a cloudy day. As mentioned before a fraction or percentage of the sun radiation entering the atmosphere does not reach the surface of the earth, some of it being reflected or absorbed. At its turn some of this absorbed radiation is reemitted, either back into space or as diffused radiation. Both direct and diffuse radiations reach the ground. On clear sky days the percentage of diffused radiation is very small if compared with direct radiation. However, on cloudy days absorption plays an important role. Clouds absorb the direct sun radiation and reemit it towards the earth with a determined wavelength (long wavelength) in the form of diffuse radiation. Depending on the thickness of the cloud and the height of its base, the amount of radiation that reaches the surface of the earth will mainly be of a direct or a diffuse manner.

For the purposes of the present invention, the clouds that are of main interest are identified as being low clouds, preferably those whose base can be found between 0 and 2 kilometers of altitude. Of special interest are those having a high content of water or those that span over and increased altitude range. In short, these are the clouds that are more opaque to direct sun radiation. When the wind farm finds itself covered by one of these clouds the received direct sun radiation will substantially be zero and the predominant received radiation will be diffuse. Comparison between the theoretical and the measured direct sun radiation it is possible to infer that the wind turbine is surrounded by clouds and is then prone to ice formation.

To experimentally validate the Hottel's model curves, radiation data from several weather stations located in Catalunya has been used. This information is freely accessible on-line from a network of automatic weather stations called XEMA.

Table 2 shows a graph with received real data and that corresponding to the Hottel's model. The weather station chosen is situated in the town of Port Bou, Girona. The geographical coordinates being 42.46 North, 3.13 East, at 26 meter above sea level and the chosen day is the $25^{th}$ of July 2010. Measurements are referred to universal time T.U. Two hours need to be added to obtain local time.

TABLE 2

| Local time | Theoretical radiation (W/m$^2$) | Measured radiation (W/m$^2$) |
|---|---|---|
| 7:00:00 | 22 | 26 |
| 8:00:00 | 150 | 215 |
| 9:00:00 | 331 | 414 |
| 10:00:00 | 522 | 590 |
| 11:00:00 | 693 | 715 |
| 12:00:00 | 826 | 874 |
| 13:00:00 | 910 | 950 |
| 14:00:00 | 936 | 963 |
| 15:00:00 | 905 | 920 |
| 16:00:00 | 817 | 823 |
| 17:00:00 | 681 | 690 |
| 18:00:00 | 509 | 513 |
| 19:00:00 | 318 | 326 |
| 20:00:00 | 137 | 114 |
| 21:00:00 | 16 | 11 |

The results have shown that the proposed model is a satisfactory approximation to the measured experimental data. The data from weather stations given the total direct and diffuse radiation value. This is acceptable in many models. An embodiment of the present invention, however, separates diffuse and direct radiation.

To estimate diffuse radiation on a horizontal surface, the following transmittance equation is considered (Liu and Jordan 1960)

$$\tau_d = 0.2710 - 0.2939\tau_b$$

$\tau_d$ being transmittance due to diffuse radiation and $\tau_b$ being transmittance due to direct radiation.

Once theoretical curves are validated for every location and the parameters corresponding to the weather season of interest chosen, a factor linking or correlating radiation on the wind turbine generator (4) and the sun/shade temperature difference may be determined. This factor may be input to a control circuit. This control circuit may relate cloudiness conditions and temperature to determine risks of ice formation. Signals, alarms and a risk register of times prone to blade (6) ice formation may be output.

In order to correlate between incident radiation and sun/shade temperature difference said temperature measurements are preferably taken on clear skies days. Advantageously temperature sensors will be protected from the wind. This may be achieved by covering said sensors with a material transparent to sun radiation. Alternatively, should the need arise for the temperature sensors to be exposed to the wind, this may be compensated and corrected on the Hottel's model considering several ranges of wind speeds.

The area around the temperature sensor exposed to sun radiation may also be painted in black so as to maximize the temperature difference between the sun and shade sides.

When implementing an ice detector it is desirable that every wind turbine generator (4) may have sensor and control means to output their own individual alarm signals. This requires that every wind generator (4) is equipped with an individual system. Another embodiment foresees the implementation of the sensor systems in a common weather station tower for the whole of the wind farm. This tower is placed at the same height as the wind turbine hubs or nacelles in the wind farm. In complex and mountainous terrain heights may vary and in extensive wind farms cloud conditions may differ from one area to another. In said cases more than one weather station towers may be implemented and place at different heights. It is also possible to install a detection system on the weather tower or in a control stand previous to implementing said system in each individual wind turbine.

The invention claimed is:

1. An ice detector system for a wind turbine generator (4), comprising:
   at least a temperature input for a signal representing the ambient temperature (2) at the location of said wind turbine generator (4), wherein the ice detector system further comprises:
   at least a direct sun radiation sensor (1) located at or on said wind turbine generator (4), and
   transmittance calculation means for calculating a parameter related to a direct sun radiation transmittance value based on a measured direct sun radiation value (5) and a predetermined reference value, and
   ice detection means for generating an ice detection signal based on said transmittance value and said ambient temperature (2) at the location of said wind turbine generator (4).

2. Ice detection system according to claim 1, wherein said direct sun radiation sensor (1) comprises a direct sun radiation temperature sensor at least partially exposed to the direct sun radiation (5), and wherein said transmittance calculating means calculate the transmittance value from the difference between measured values by said sun radiation temperature sensor and said ambient temperature (2).

3. Ice detection system according to claim 1, wherein said predetermined reference value is the direct sun radiation value (5) received on or at the wind turbine location on a day without the presence of clouds.

4. Ice detection system according to claim 3, wherein said predetermined reference value is calculated by a Hottel's model.

5. Ice detection system according to claim 1, wherein said direct sun radiation sensor located at or on said wind turbine generator (4) comprises at least a pyranometer.

6. Ice detection system according to claim 1, comprising:
   at least an ambient temperature (2) sensor for measuring the ambient temperature (2) at the location of said wind turbine, and
   means for sending said measured ambient temperature (2) value to said ambient temperature (2) input.

7. A control system for a wind turbine generator (4) having an ice detection system according to claim 1, comprising:

input means for receiving alarm and output signals from said ice detection system, and actuating means for controlling wind turbine operation based on said alarm and output signals.

8. Wind farm having an ice detection system according to claim 1, wherein said ice detection system is placed at substantially the same height as the wind turbine hubs or nacelles (3) situated inside the wind farm.

9. Wind farm having an ice detection system according to claim 1, wherein said ice detection system is placed on at least a nacelle (3) from a wind turbine generator (4) situated inside the wind farm.

10. Ice detecting method for a wind turbine, comprising the steps of:

providing at least a signal representing the ambient temperature (2) at the location of said wind turbine generator (4), characterized by measuring the direct sun radiation at or on said wind turbine generator (4), and calculating a parameter related to a direct sun radiation transmittance value calculated by a measured direct sun radiation value and a predetermined reference value, and generating an ice detection signal depending on the value of said transmittance value and said ambient temperature (2) at the location of the wind turbine generator (4).

11. Ice detecting method according to claim 10, wherein the step of measuring the direct sun radiation at or on said wind turbine generator (4) includes the step of measuring the temperature of a sensor at least partially exposed to the direct sun radiation, and the step of calculating a parameter related to the direct sun radiation transmittance value includes factoring in the difference between the temperature of the sensor at least partially exposed to the direct sun radiation and the ambient temperature (2).

\* \* \* \* \*